(12) United States Patent
Larson

(10) Patent No.: US 12,710,302 B2
(45) Date of Patent: Aug. 18, 2026

(54) ADJUSTABLE METER TAIL AND METER BOX CONNECTION

(71) Applicant: Mueller International, LLC, Atlanta, GA (US)

(72) Inventor: Ryan Fairchild Larson, Decatur, IL (US)

(73) Assignee: Mueller International, LLC, Atlanta, GA (US)

( * ) Notice: Subject to any disclaimer, the term of this patent is extended or adjusted under 35 U.S.C. 154(b) by 217 days.

(21) Appl. No.: 18/381,474

(22) Filed: Oct. 18, 2023

(65) Prior Publication Data

US 2025/0130089 A1 Apr. 24, 2025

(51) Int. Cl.
*G01F 15/18* (2006.01)
*G01D 4/02* (2006.01)
*G01F 15/14* (2006.01)

(52) U.S. Cl.
CPC ............. *G01F 15/185* (2013.01); *G01D 4/02* (2013.01)

(58) Field of Classification Search
CPC ........ G01F 15/185; G01F 1/66; G01F 15/007; G01F 15/14; G01D 4/02; H02G 3/08; H02G 15/013; H02G 3/088; F16L 37/144; F16L 25/025; E03C 1/021; F16B 37/16; E03D 11/16; G01R 11/24; G01R 11/04; G01R 1/04; G01R 22/066; H02B 1/063; H01B 17/583; D06F 39/08; G02B 6/4447; G02B 6/44515; G02B 6/4446; G02B 6/44715; G01N 1/2294
USPC .......................................................... 73/201
See application file for complete search history.

(56) References Cited

U.S. PATENT DOCUMENTS

2022/0325824 A1* 10/2022 White ...................... F16K 5/08

OTHER PUBLICATIONS

A.Y. Mcdonald Mfg. Co.; Submittal Data Sheet for NL Ball Style Meter Stop, Oct. 2020, 1 pg.
A.Y. Mcdonald Mfg. Co.; Submittal Data Sheet for NL Ball Style Meter Stop, Sep. 2020, 1 pg.
The Ford Meter Box Company, Inc.; Photo of Ford adjustable meter box connection, publicly available prior to Oct. 18, 2023, 1 pg.
USABluebook; Catalog for Flow Metering Meter Brass, 2022, 3 pgs.
Mueller Co.; Catalog for 45° & 90° Angle Meter Couplings, Aug. 2019, 6 pgs.
Mueller Co.; Catalog for Ball Angle Meter Valves 3/4" & 1" Sizes, Sep. 2016, 18 pgs.
Mueller Co.; Drawing for H-10891N Straight Meter Coupling Low Lead Brass (Meter CPLG Nut×MIP), Feb. 17, 2010, 1 pg.
Mueller Co.; Drawing for Low Lead Brass Insulated Tailpiece Assembly—Part H10871N, Sep. 17, 2009, 1 pg.

* cited by examiner

*Primary Examiner* — Brandi N Hopkins
(74) *Attorney, Agent, or Firm* — Smith, Gambrell & Russell, LLC

(57) ABSTRACT

A meter tail includes an adapter configured to be received within and secured to an opening defined within a meter box; and a tail piece defining a first end and a second end and extending from the adapter, the first end engaged with the adapter and the second end configured to be engaged with a meter, the tail piece extending unbroken from the first end to the second end.

20 Claims, 10 Drawing Sheets

295
296
798
215
212
290
719
216
210a
211
210
141
225
210b
717
718
222
226
220a
265
220
221
220b
727
728
266
200b
235
260
768
737b
230a
232
737a
230c
236
230
734
230b
231,
738

ADJUSTABLE METER TAIL AND METER BOX CONNECTION

TECHNICAL FIELD

Field of Use

This disclosure relates to mechanical connections inside a meter box of a fluid distribution system. More specifically, this disclosure relates to mechanical connections for adjustably securing a meter of the fluid distribution system to the meter box.

Related Art

A meter such as, for example and without limitation, a meter used to measure water flow and, more specifically, water usage of an end user in a municipal water system, is typically installed in a pit in the ground. A space for the meter during such installation, including in a longitudinal direction of the meter extending between and through the connecting ends of the meter, can vary depending on the installation conditions. For example, a meter box installed in the ground to hold back dirt or other ground or back-fill material can be or can become out of round after back filling or during use or servicing, and this can reduce the space for the meter and any surrounding tubing or piping connected to the meter.

SUMMARY

It is to be understood that this summary is not an extensive overview of the disclosure. This summary is exemplary and not restrictive and is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is a meter tail comprising: an adapter configured to be received within and secured to an opening defined within a meter box; and a tail piece defining a first end and a second end and extending from the adapter, the first end engaged with the adapter and the second end configured to be engaged with a meter, the tail piece extending unbroken from the first end to the second end.

In a further aspect, disclosed is a meter box system comprising: a meter box; and a meter tail comprising: an adapter received within and secured to an opening defined in a meter box wall of the meter box; and a tail piece defining a first end and a second end and extending from the adapter, the first end engaged with the adapter and the second end configured to be engaged with a meter, a tail piece of the meter tail being slideably adjustable with respect to the adapter.

In yet another aspect, disclosed is a method of assembling a meter tail, the method comprising: securing an adapter of the meter tail to an opening defined within a meter box; and slideably adjusting an axial position of a tail piece of the meter tail with respect to the adapter.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and, together with the description, explain various principles of the disclosure. The drawings are not necessarily drawn to scale. Corresponding features and components throughout the figures may be designated by matching reference characters for the sake of consistency and clarity.

DETAILED DESCRIPTION

Figure 1:
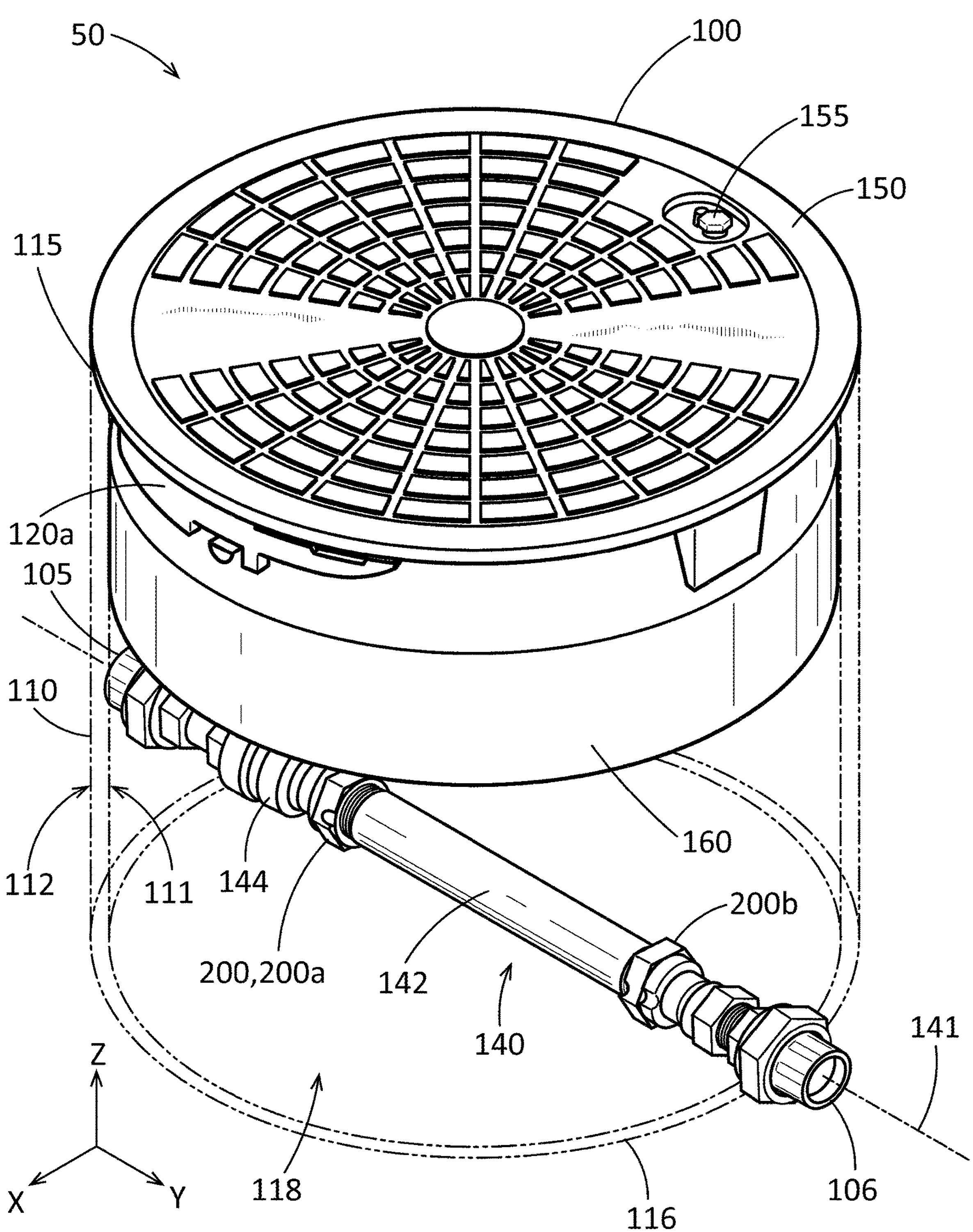
FIG. 1 is a top perspective view of a meter box system in accordance with one aspect of the current disclosure.

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an," and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes, and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams. Unless otherwise specified herein, any structure disclosed in the drawings or in the written description as being so formed can be monolithic whether or not such an explicit description of the structure is included herein.

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the meter box system nearest to and occupied by or intended to be occupied by a meter; "rear" is that end of the meter box system that is opposite or distal the front; "left" is that which is to the left of or facing left from a person facing towards the front; and "right" is that which is to the right of or facing right from that same person while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

The meter box system can also be described using a coordinate axis of X-Y-Z directions shown in FIG. 1. An X-axis direction can be referred to as a left-right or horizontal direction. An upper-lower direction is a Z-axis direction orthogonal to the X-axis direction and to a Y-axis direction. The Y-axis direction is orthogonal to the X-axis direction (left-right direction) and the Z-axis direction (upper-lower direction) and can also be referred to as a front-rear direction. A surface of a structural element that is parallel with the front-rear direction can be referred to as a lateral side.

In one aspect, a meter box system and associated methods, systems, devices, and various apparatuses are disclosed herein. In one aspect, the meter box system can comprise an adjustable meter tail.

Again, as noted above, an installation space for a meter such as, for example and without limitation, a meter used to measure water flow and, more specifically, water usage of an end user in a municipal water system can vary depending on the installation conditions. For example, a meter box formed from or comprising a flexible material such as polyvinylchloride (PVC) or another polymer can be or can become out of round after back filling, and this can reduce the space for the meter. As disclosed herein, a user can adjust the space for the meter by adjusting the meter tail assembly.

FIG. 1 is a top perspective view of a meter box system 50 in accordance with one aspect of the current disclosure. The meter box system 50 can comprise a pit assembly or meter box assembly or meter pit or meter box 100. The meter box 100 can comprise a meter box wall 110, one or more lid rails 120*a,b* (120*b* shown in FIG. 2), and a lid 150. The meter box wall 110 can define an inner surface 111, an outer surface 112, an upper end 115 defining a pit opening 108 (shown in FIG. 2), and a lower end 116. The inner surface 111 can define an interior cavity 118.

In some aspects, as shown, a horizontal cross-section or radial cross-section of the meter box wall 110 (i.e., a cross section taken in a plane extending in a radial direction at one axial position of the meter box wall 110) can be cylindrical in shape, and the inner surface 111 and/or the outer surface 112 can likewise be cylindrical. In other aspects, the meter box wall 110 can have a different-shaped cross-section such as, for example and without limitation, a square shape, a rectangular shape, or any polygonal or other closed shape. In some aspects, an original or unloaded cross-sectional shape of the meter box wall 110 can be one of disclosed above, but in a loaded condition the cross-sectional shape of the meter box wall 110 can change due to deformation thereof. For example and without limitation, an actual diameter 117 (shown in FIG. 3A) or a nominal diameter of the meter box wall 110 can be between 15 and 24 inches. In some aspects, the diameter 117 can be less than or equal to 20 inches. In some aspects, the diameter 117 can be less than or equal to 18 inches. When deformed, the actual diameter 117—and radius—can vary based on where it is measured. The actual diameter 117 can, in a direction parallel to an axis 141 of piping 140, be less than or greater than a direction angled with respect to the axis 141. In some aspects, the meter box wall 110 can be formed from or can comprise a flexible material such as, for example and without limitation, polyvinylchloride (PVC) or another polymer. In some aspects, the meter box wall 110 can be formed from or can comprise a rigid material such as, for example and without limitation, cast iron or concrete. In one aspect, the second rail 120*b* can be secured to the inner surface 111 of the meter box wall 110 at a position opposite a first rail 120*a*. The meter box 100 and, more specifically, the piping 140 thereof can comprise or define an inlet 105 and an outlet 106.

The meter box 100 can comprise an insulation panel 160, which can be positioned beneath the lid 150 and can reduce heat transfer between a first portion of the interior cavity 118 that is above the insulation panel 160 and a second portion of the interior cavity 118 that is below the insulation panel 160. The insulation panel 160 can reduce the risk of freezing of the piping 140 and other components of the meter box 100. In some aspects, as shown, the lid 150 can be circular in shape when viewed from a top thereof. In some aspects, the lid 150 can have another shape such as, for example and without limitation, a cross-sectional shape disclosed above for the meter box 100 and can match a cross-sectional shape of the meter box 100. Each of or either of the rails 120*a,b* can be secured to the inner surface 111 of the meter box wall 110 using, for example and without limitation, a plurality of fasteners (not shown) such as rivets or screws, each of which can be made to extend through the rail 120*a,b* and the meter box wall 110. The lid 150 can comprise a lock 155, which can engage and secure another portion of the meter box 100 such as, for example and without limitation, the one or more rails 120*a,b*.

The meter box system 50 can comprise a meter 80 (shown in FIG. 2), which can be represented as shown in FIGS. 1 and 3 with an idler or meter jumper or piping portion 142. The meter 80 can replace the piping portion 142 of the piping 140 either before installation (e.g., during manufacturing or assembly) or after installation of the meter box system 50. The meter box system 50 can comprise one or more meter box connections or meter box tails or meter tails 200. More specifically, the meter box system 50 can comprise a meter box connection or meter box tail or meter tail 200*a*, which can be an inlet meter tail. The meter box system 50 can define the inlet 105. The meter box system 50 can be configured to supply water to the meter 80. Similarly, the meter box system 50 can comprise a meter box connection or meter box tail or meter tail 200*b*, which can be an outlet meter tail. The meter box system 50 can define the outlet 106. The meter box system 50 can be configured to receive water exiting the meter 80. Either of the meter tails 200*a,b* can comprise a valve. As shown, the meter tail 200*a* can comprise a valve 144, which can be configured to turn off flow of a fluid (e.g., water) being supplied to the meter 80 such, for example, during inspection, repair, and/or replacement of the meter.

In some aspects, two or more portions of the piping 140 such as, for example and without limitation, the meter tails 200*a,b*, the piping portion 142, and/or the meter 80—or the inlet 85 (shown in FIG. 2) or outlet 86 (shown in FIG. 2) thereof—can be aligned along the axis 141. In some aspects, as shown, all portions of the piping 140 can be aligned along the axis 141. In some aspects, two or more portions of the piping 140 such as, for example and without limitation, the meter tails 200*a,b*, the piping portion 142, and/or the meter 80—or the inlet 85 (shown in FIG. 2) or outlet 86 (shown in FIG. 2) thereof-need not be aligned along the axis 141.

To adjust for a distance 170 between the meter box wall 110 and the meter 80, which can vary from one installation to another, a length of one or both of the meter tails 200*a,b* can themselves be adjustable. More specifically, as shown, a length of the meter tail 200*b* defining the outlet 106 can be adjustable. Moreover, with adjustability of the length of the meter tail 200*b*, a length of the meter tail 200*a* need not be adjustable.

Figure 2:
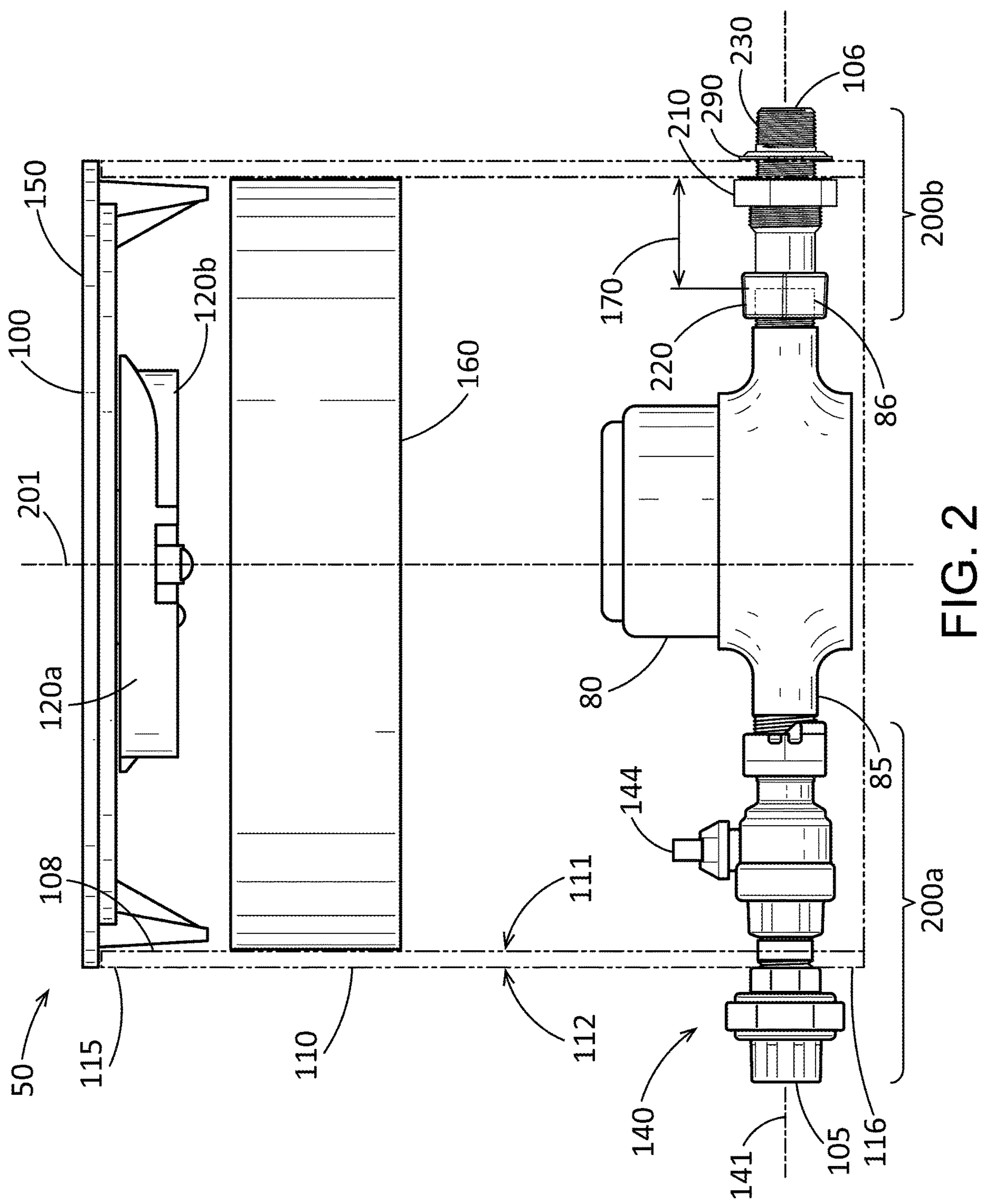
FIG. 2 is a side view of the meter box system of FIG. 1 in accordance with another aspect of the current disclosure showing a meter.

FIG. 2 is a side view of the meter box system 50 of FIG. 1 in accordance with another aspect of the current disclosure. The meter box 100 can define an axis 201. The meter tail 200*b*—or the meter tail 200*a*, with respect to all that is disclosed herein and with modifications to incorporate the valve 144, if a valve is desired (in other words, the meter tail 200*a* can incorporate a valve)—can comprise an adapter 210. The adapter 210 can be configured to be received within an opening 218 (shown in FIG. 6) defined in a neighboring structure. More specifically, the opening 218 can be defined in the meter box 100 and more specifically, in the meter box wall 110. In some aspects, the opening 218 can be circular or substantially so (e.g., when the meter box wall 110 is in a flattened condition or in an assembled condition as shown). More specifically, as shown, the adapter 210 can be configured to be secured to—and can be secured to—the meter box 100, and the adapter 210 can be configured to secure—and can secure—the meter tail 200*b* to the meter box 100. More specifically, the adapter 210 can be secured to the meter box wall 110 with, at least in part, a fastener 290, which can be an adapter assembly fastener.

The meter tail 200*b* can comprise a nut 220. As shown, the nut 220 can be configured to be connected to—and can be connected to—the meter 80, and the nut 220 can be configured to secure—and can secure—the meter tail 200*b* to the meter 80. The meter 80 can define an inlet end or first end 85 and an outlet end or second end 86.

The meter tail 200*b* can comprise a tail piece 230. The tail piece 230 can extend from the adapter 210 to the nut 220. The tail piece 230 can extend at least partly through each of or either of the adapter 210 and the nut 220. The tail piece 230 can engage with each of or either of the adapter 210 and the nut 220.

Figure 3A:
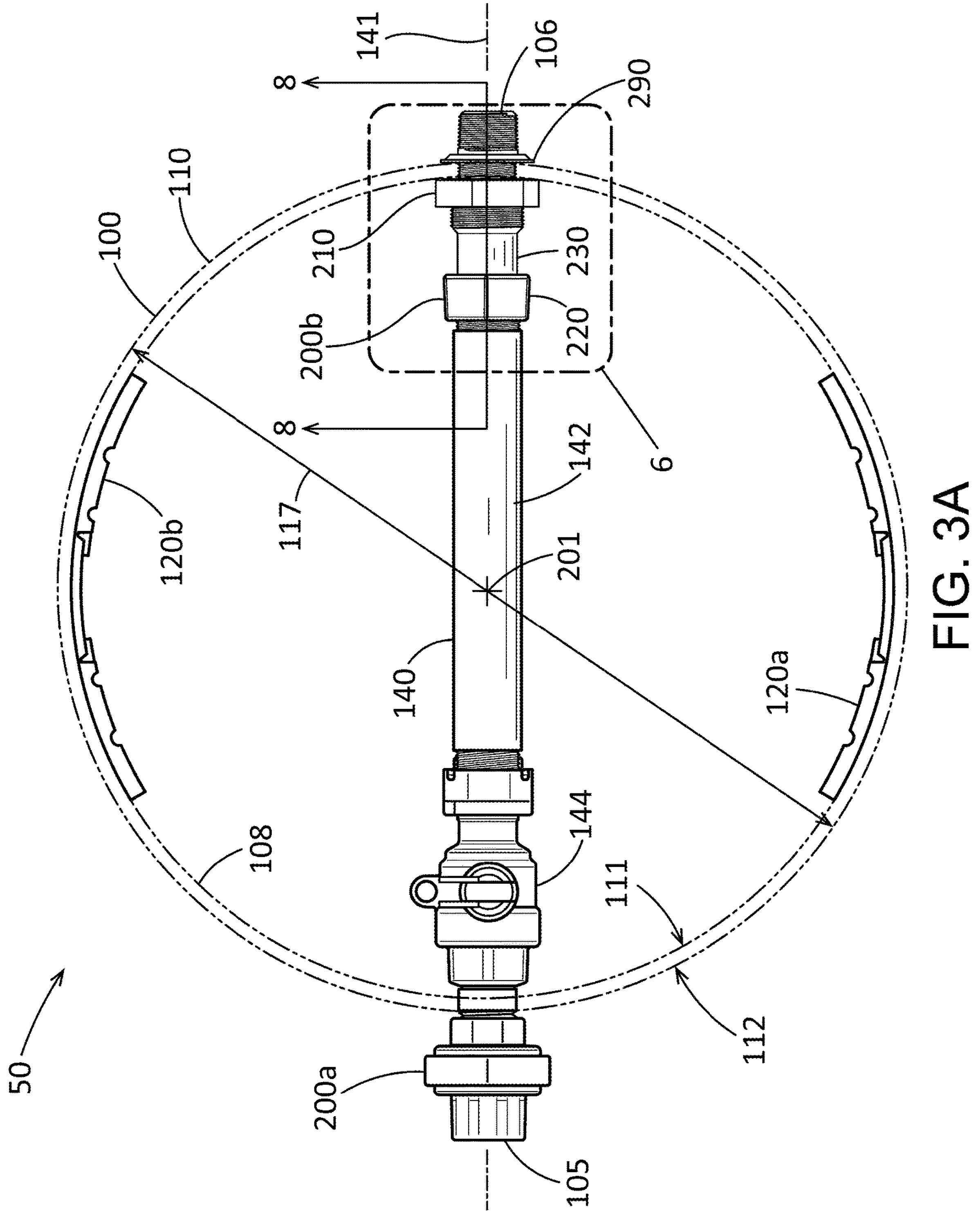
FIG. 3A is a top view of the meter box system of FIG. 1 with a lid of the meter box system removed for clarity.

FIG. 3A is a top view of the meter box system 50 of FIG. 1 with the lid 150 of the meter box system 50 removed for clarity and prior to installation of the meter 80 (shown in FIG. 2). As shown, the adapter 210 can extend through the meter box wall 110. During use of the installed meter box, a thrust force can act on the meter box wall 110. In addition to being able to adjust to and from the meter 80, movement of the meter box wall 110 can also stretch the piping 140 to some extent and/or pull the whole box toward the piping 140. When the meter tail 200*b* is pulled toward the meter 80, this can stretch a portion of the piping 140 such as, for example and without limitation, a portion of the piping 140 positioned outside of the meter box 100. This stretching can apply a compression load on the inside of the meter box wall 110 against the adapter 210 or a portion thereof. When the meter tail is pushed away from the meter, this can compress or snake the pipe outside of the box. This can put a compression load on the outside of the meter box wall 110 at the fastener 290. Again, as shown, the adapter 210 can be secured to the meter box wall 110.

Figure 3B:
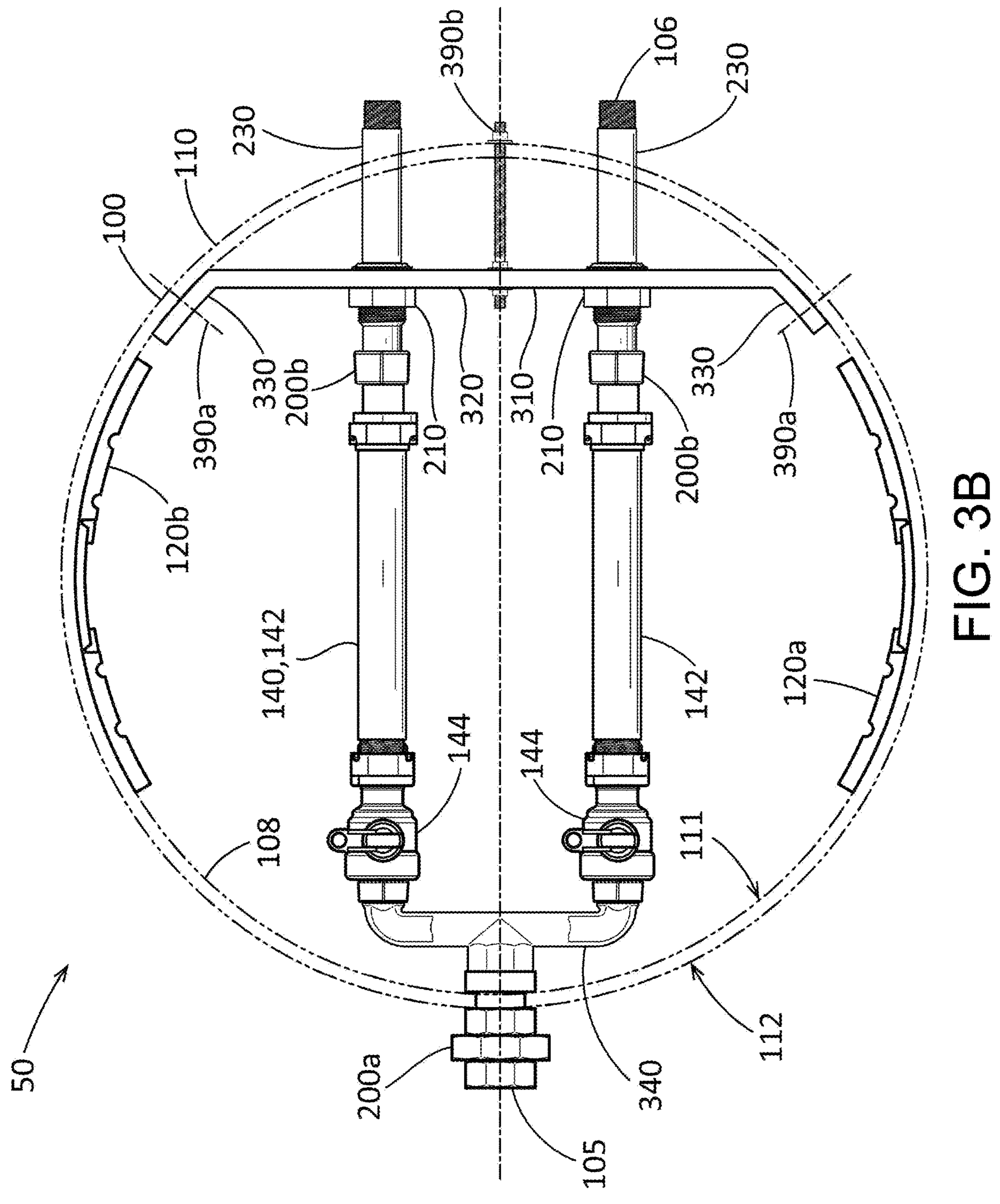
FIG. 3B is a top view of the meter box system of FIG. 1 in accordance with another aspect of the current disclosure showing a tandem meter setup.

FIG. 3B is a top view of the meter box system 50 of FIG. 1 in accordance with another aspect of the current disclosure showing a tandem meter setup. As shown, the meter box system 50 can comprise a tandem box, which can be configured to hold two meters 80 in parallel, e.g., for two different houses or for one house that has a first meter for standard water supply to the house and a second meter for other water use, e.g., irrigation. A pair of the piping portions 142 can extend from the meter tail 200*a*. The pair of the piping portions 142 can extend from a Y-fitting or branch fitting or manifold 340, which can define a single inlet and two or more outlets. As shown, the manifold 340 can define a pair of outlets, each outlet configured to receive one of the meters 80 (shown in FIG. 2). The adapter 210 can be secured to a bracket 310. The bracket 310, which can be a strap or plate, can comprise a first portion 320 and one or more flanges or second portions 330, each of which can be secured to the meter box wall 110 with one or more fasteners 390*a*. The bracket 310 can be formed from a blank, and each of the portions 320, 330 can be planar. In some aspects, the bracket 310 can be secured to the meter box wall 110 with a fastener 390*b*, which can be positioned between the meter tails 200*b*. As shown, a length of each of the meter tails 200*b* be extended to extend out of the meter box 100. The bracket 310 can be extended to the meter pit wall 110 on one or both sides. The bracket 310 can help avoid side—to—side movement of the piping 140 and the piping portions 142 (or the meters 80) as the thrust load is caused to act on the plate from adjusting the meter tails 200*b*.

Figure 4:
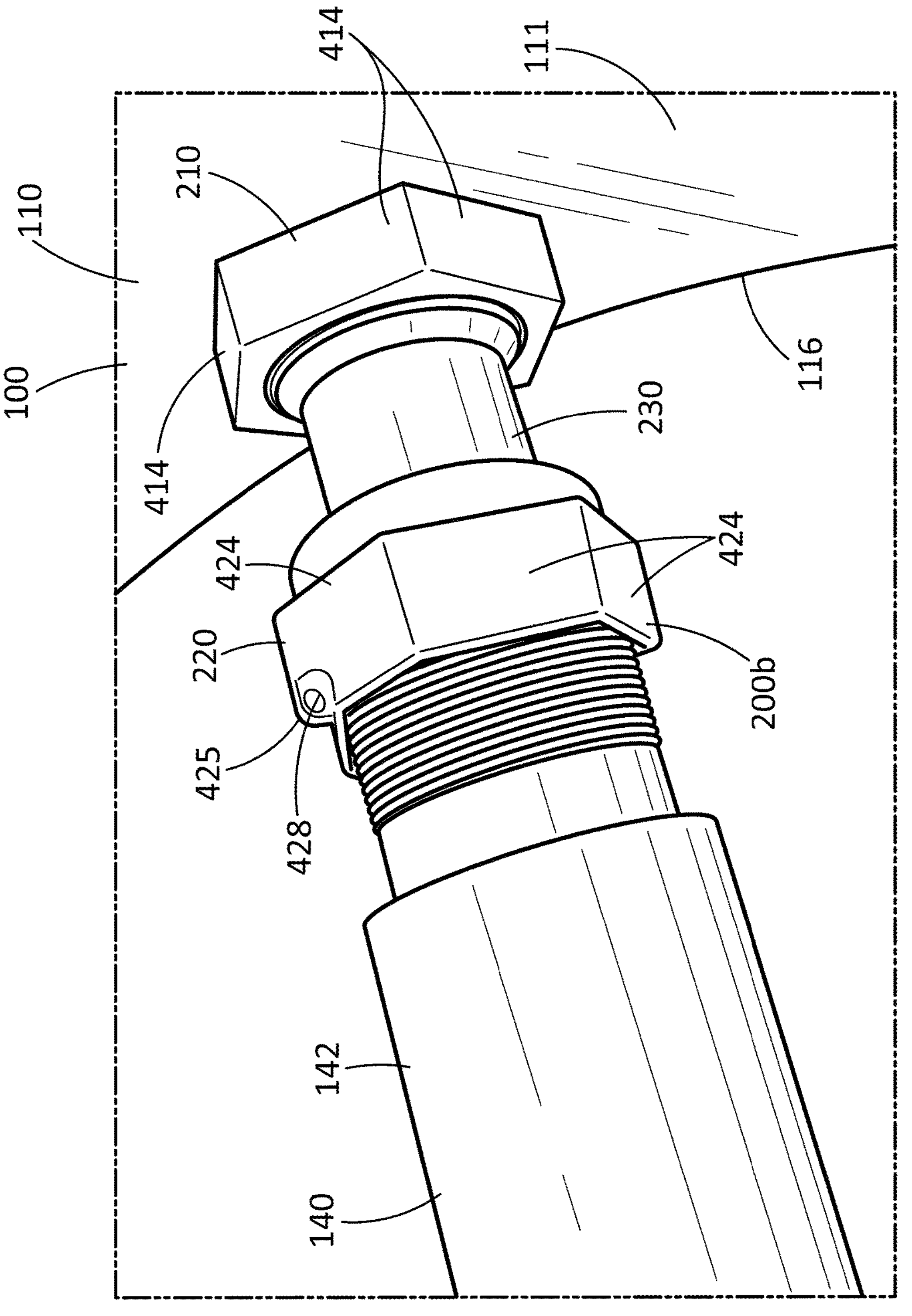
FIG. 4 is a top perspective detail view of an inside portion of an installed meter tail of the meter box system of FIG. 1.

FIG. 4 is a top perspective detail view of an inside portion of the installed meter tail 200*b* of the meter box system 50 of FIG. 1. A portion of the tail piece 230 can be received at least partially within the adapter 210. A portion of the tail piece 230 can be received at least partially within the nut 220. The nut 220 can define a fastening attachment 425, which through use of another fastener (e.g., a wire tie) can be configured to indicate that a rotational position of the nut 220 with respect to a rotational position of one of a surrounding portion of the meter 80 (shown in FIG. 2), the meter box 100, and the meter tail 200*b* has changed (e.g., via tampering by the breaking of the wire tie). More specifically, the fastening attachment 425 can define an opening 428. Each of or either of the adapter 210 and the nut 220 can define respective flats 414, 424, which can be configured to receive a wrench. In some aspects, each of or either of the adapter 210 and the nut 220 can define at least two such flats 414, 424. More specifically, each of or either of the adapter 210 and the nut 220 can define six such flats 414, 424 and can thereby define a hexagonal shape.

Figure 5:
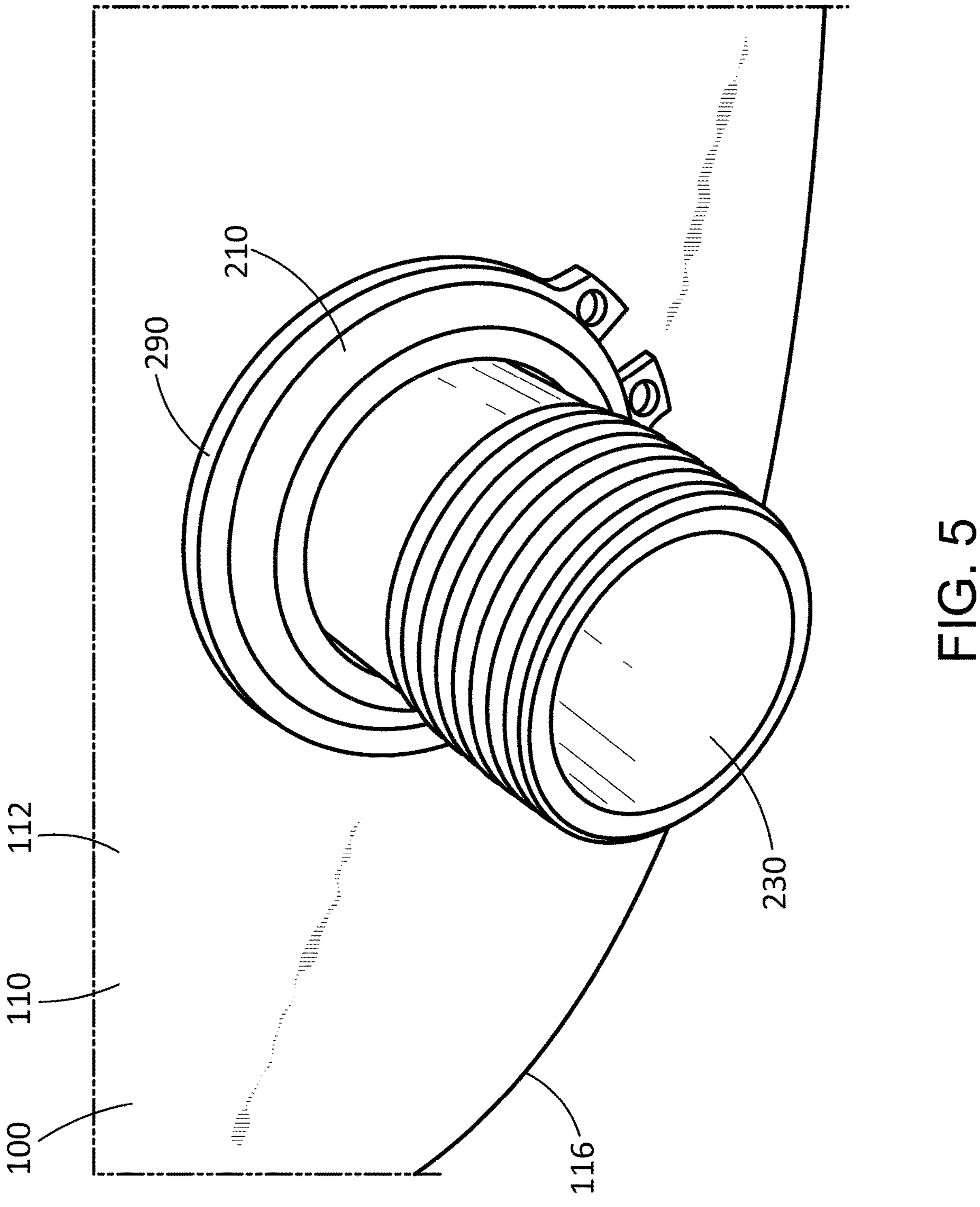
FIG. 5 is a top perspective detail view of an outside portion of the installed meter tail of the meter box system of FIG. 1.

FIG. 5 is a top perspective detail view of an outside portion of the installed meter tail 200*b* of the meter box system 50 of FIG. 1. Again, the fastener 290 can be configured to secure the adapter 210 to the meter box 100. The fastener 290 can be received within a groove 719 (shown in FIG. 7) defined in an outer surface of the adapter 210. As again shown, the tail piece 230 and, more generally, the meter tail 200*b* can extend or protrude from and past the outer surface 112 of the meter box wall 110.

Figure 6:
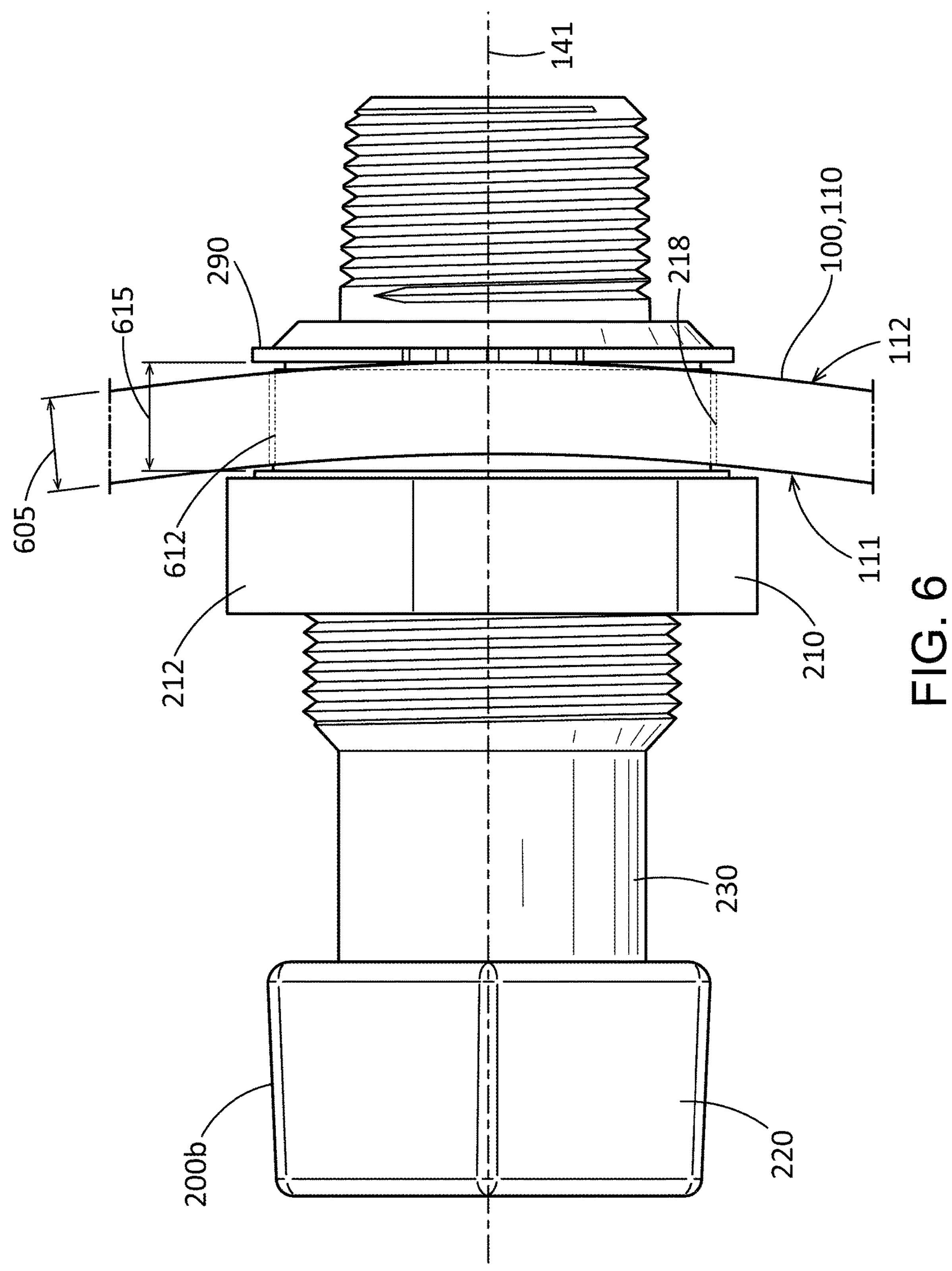
FIG. 6 is a top detail view of the meter box system of FIG. 1 taken from detail 6 of FIG. 3A.

FIG. 6 is a top detail view of the meter box system 50 of FIG. 1 taken from detail 6 of FIG. 3A. As shown, a width 615 of a space or groove or portion 612 of the outer surface 212 can be defined by the adapter 210 and can be sized to receive the meter box wall 110. In some aspects, the width 615 can be larger than a thickness 605 of the meter box wall 110. In some aspects, the width 615 can be approximately equal to the thickness 605, including when the diameter 117 (shown in FIG. 3A) is sufficiently large or the meter box 100 defines a rectangular shape in cross-section. Depending on the material of the meter box 100, the thickness 605 of the meter box wall 110 can vary. In some aspects, the thickness 605 of the meter box wall 110 can be less than or equal to about ⅜ inch. In some aspects, as shown, no seal need be present between the adapter 210 and the meter box wall 110 on either an outer side or an inner side. More specifically, the adapter 210 can be allowed to rotate or swivel in the meter box wall 110 as needed without impacting a connection between the tail piece 230 and a connecting portion of a fluid distribution system (not shown) at a first end 235 or a connection between the tail piece 230 and the nut 220 at a second end 236. In some aspects, a seal can be positioned between the adapter 210 and the meter box wall 110. With or without such any seal between the opening 218 and the adapter 210, movement of solids or liquids from an outside of the meter box to an inside of the meter box through the opening 218, or vice versa, need not—and, as shown, does not—contaminate any liquid received inside the piping 140 including the meter 80 because, as shown, no opening to an interior cavity of the piping 140 need be defined in the tail piece 230.

Figure 7:
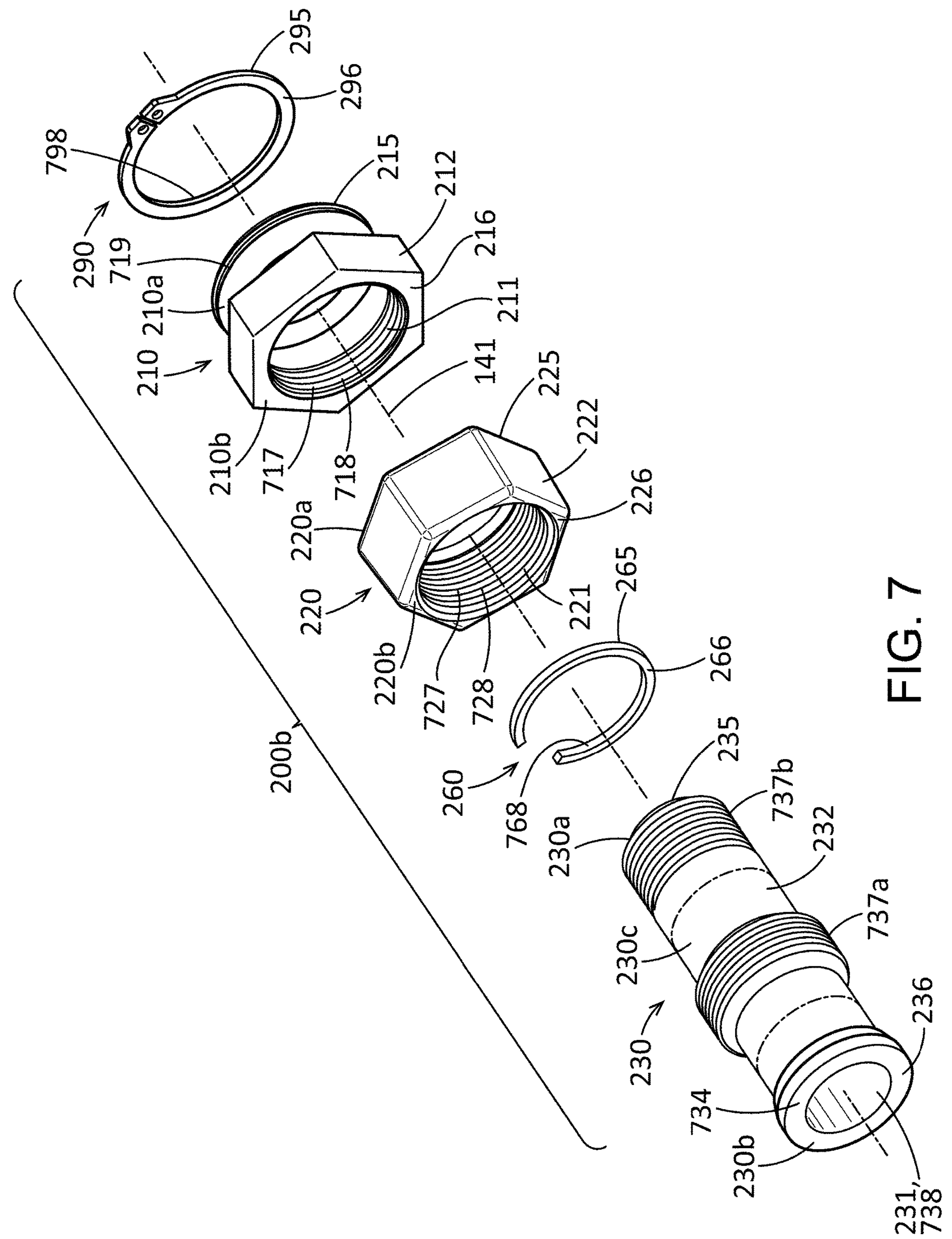
FIG. 7 is an exploded inside top perspective view of the meter tail of FIG. 4.

FIG. 7 is an exploded inside top perspective view of the meter tail 200*b* of FIG. 4. Again, the meter tail 200*b* can comprise one or more of the adapter 210, the nut 220, and the tail piece 230. In some aspects, the meter tail 200*b* can further comprise the fastener 290, which can be a first fastener. In some aspects, the meter tail 200*b* can further comprise a fastener 260, which can be a nut assembly fastener or a tail piece assembly fastener or a second fastener. One or more of the adapter 210, the nut 220, the tail piece 230, the fastener 260, and the fastener 290 can be aligned along the axis 141.

The adapter 210 can define a first end 215, a second end 216, an axial thickness measured from the first end 215 to the second end 216, an inner surface 211, and an outer surface 212. The adapter 210 can define a bore 718. The adapter 210 can define a connection portion 717, which can be a threaded portion, in the bore 718. The connection portion 717, which can be a female connection portion or female threaded portion, can define, at least in part, the bore 718. The adapter 210 can define a first portion 210*a*, which can be proximate to or extending from the first end 215. The adapter 210 can define a second portion 210*b*, which can be proximate to or extend from the second end 216. The first portion 230*a* can define the groove 719, which can be offset from the first end 215. The second end 216 and, more generally, the second portion 210*b* can define the connection portion 717.

The nut 220 can define a first end 225, a second end 226, an axial thickness measured from the first end 225 to the second end 226, an inner surface 221, and an outer surface 222. The nut 220 can define a bore 728. The nut 220 can define a connection portion 727, which can be a threaded portion, in the bore 728. The connection portion 727, which can be a female connection portion or female threaded portion, can define, at least in part, the bore 728. The nut 220 can define a first portion 220*a* proximate to or extending from the first end 225 and a second portion 220*b* proximate to or extending from the second end 226. The first portion 220*a* can define a groove 729 (shown in FIG. 8), which can be offset from the first end 225. The second end 226 and, more generally, the second portion 220*b* can define the connection portion 727. In some aspects, the connection portion 727 can define straight threads. In some aspects, as shown, the connection portion 727 can define tapered or pipe threads (e.g., NIP threads or, more specifically, FIP threads).

The tail piece 230 can define the first end 235, the second end 236, an axial thickness measured from the first end 235 to the second end 236, an inner surface 231, and an outer surface 232. The tail piece 230 can define a bore 738. The tail piece 230 can define a first portion 230*a*, which can be proximate to or extend from the first end 235. The tail piece 230 can define a second portion 230*b*, which can be proximate to or extend from the second end 236. The second portion 230*b* and, more specifically, the second end 236 can define a flange 734. The tail piece 230 can define a third portion 230*c*, which can be defined between, can extend between, and can separate the first portion 230*a* and the second portion 230*b*. In some aspects, the third portion 230*c* can be offset from each of or either of the first end 235 and the second end 236.

The tail piece 230 can define a first connection portion 737*a* in the outer surface 232. The first connection portion 737*a*, which can be a first threaded portion, can define, at least in part, the outer surface 232. A portion of the tail piece 230 such as, for example and without limitation, the first portion 230*a* or, as shown, the third portion 230*c* can specifically define the first connection portion 737*a*. In some aspects, a portion of the tail piece 230 positioned between the first end 235 and the second end 236 and offset from each of or either of the first end 235 and the second end 236 can define the first connection portion 737*a*. In some aspects, as shown, the first portion 230*a* of the tail piece 230 can define a second connection portion 737*b*, which can be a second threaded portion. The first connection portion 737*a* can be configured to engage with the connection portion 717 or, more specifically, the threaded portion of the adapter 210. Each of or either of the first connection portion 737*a* and the second connection portion 737*b* can be a male connection portion or male threaded portion. In some aspects, each of or either of the first connection portion 737*a* and the second connection portion 737*b* can define straight threads. In some aspects, as shown, the second connection portion 737*b* can define tapered or pipe threads (e.g., NIP threads or, more specifically, MIP threads).

Figure 8:
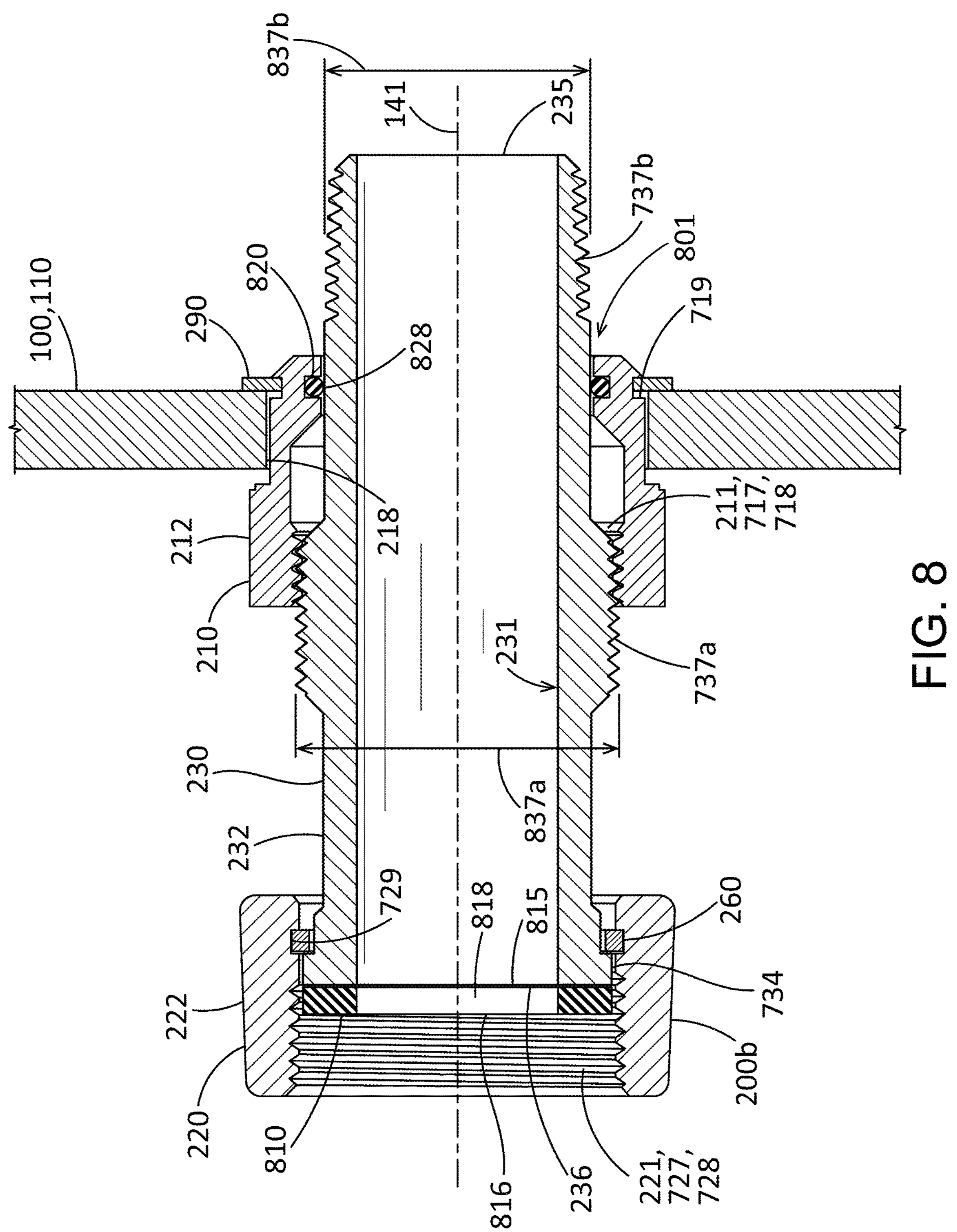
FIG. 8 is a sectional view of the meter tail of FIG. 4 taken along line 8-8 of FIG. 3A in accordance with one aspect of the current disclosure.

The fastener 260 can define a first end 265 and a second end 266 and an axial thickness measured from the first end 265 to the second end 266. The fastener 260 can define a bore 768. In some aspects, as shown, the fastener 260 can be an open ring or split ring and can be expanded during assembly to fit over one of the first end 235 and the second end 236 of the tail piece 230 and then allowed to return to its original shape and engage the tail piece 230 and, more specifically, the flange 734. For example and without limitation, the fastener 260 can be a retaining ring. As shown, the fastener 260 need not require a tool for a removal. As shown in FIG. 8, the fastener 260 can be received within the groove 729 of the nut 220. As also shown, the fastener 260 can engage each of or either of the nut 220 and the tail piece 230. More specifically, the fastener 260 can engage each of or either of the groove 729 of the nut 220 and the flange 734 of the tail piece 230.

The fastener 290 can define a first end 295 and a second end 296 and an axial thickness measured from the first end 295 to the second end 296. The fastener 290 can define a bore 798. In some aspects, as shown, the fastener 290 can be an open ring or split ring and can be expanded during assembly to fit over the first end 215 of the adapter 210 and then allowed to return to its original shape and engage the adapter 210 and, more specifically, the groove 719. In some aspects, for example, the fastener 290 can be a retaining ring or snap ring. In some aspects, the fastener 290 can be another fastener such as, for example and without limitation, a jam nut. More specifically, the first end 215 of the adapter 210 and, more specifically, the outer surface 212 thereof can define a male threaded portion and a nut can engage such portion and thereby secure the adapter 210. In some aspects, the adapter 210 can be assembled to the meter box wall 110 with swaging, brazing, an adhesive (e.g., thread lock chemical such as, for example and without limitation, a Loctite® threadlocker), and/or a press fit. As shown, the fastener 260 can be removable with a tool such as, for example and without limitation, retaining ring pliers. As also shown, the fastener 290 can engage each of or either of the adapter 210 and the meter box 100. More specifically, the fastener 290 can engage each of or either of the groove 719 of the adapter 210 and the meter box wall 110 of the meter box 100.

FIG. 8 is a sectional view of the meter tail 200*b* of FIG. 4 taken along line 8-8 of FIG. 3A in accordance with one aspect of the current disclosure. As shown, the tail piece 230 can extend unbroken from the first end 235 to the second end 236. By "extending unbroken," the material of the tail piece 230 sealably extends across a distance (e.g., from the first end 235 to the second end 236). In some aspects, the material of the tail piece 230 can extend without any joints or seams or with only joints or seams formed by welding or by other methods separable only by cutting or other destructive processes. In some aspects, the tail piece 230 defines no leak path between the first end 235 and the second end 236. In some aspects, the tail piece 230 defines no leak path between a connection between the adapter 210 and the tail piece 230 and a connection the nut 220 and the tail piece 230. More specifically, the tail piece 230 need not be monolithic. In some aspects, as shown, the tail piece 230 can be monolithic. As shown, a portion of the tail piece positioned between the first end 235 and the second end 236 and offset from each of the first end 235 and the second end 236 can define the first connection portion 737*a*, which can be configured to slideably engage with the connection portion 717 of the adapter 210.

As shown, a maximum diameter 837*a* of the first connection portion 737*a* can be greater than a maximum diameter 837*b* of the second connection portion 737*b* or, alternatively, a portion of the tail piece 230 extending between the first connection portion 737*a* and one of the first end 235 and the second end 236. As also shown, a maximum diameter of the flange 734 can be greater than the maximum diameter 837*b* of the second connection portion 737*b* or, alternatively, any remaining portion of the tail piece 230 such as, for example and without limitation, other portions disclosed herein. In some aspects, a maximum diameter of the flange 734 can be greater than an inside diameter of the fastener 260. In some aspects, a maximum diameter or width of the flange 734 can be sized to engage with the piping 140 and/or the meter 80 via a flanged connection. More specifically, one or more fasteners such as, for example and without limitation, a pair of bolts, can secure the flanged connection by securing the flange 734 to a mating flange or other receiving portion of the piping 140 and/or the meter 80. The flange 734 need not have rotational symmetry and can extend in a radial direction relative to the axis 141 only where each of the one or more fasteners is received therethrough. More specifically, the meter tail 200*b* need not comprise the nut 220. In some aspects, a portion of the tail piece 230 extending between the first connection portion 737*a* and either of the first end 235 and the second end 236 and, more specifically, forming the outer surface 232 can define a cylindrical surface.

The meter tail 200*b* can comprise a first gasket or seal 810. The seal 810, which can be an axial seal, can define a first end 815 and a second end 816 and an axial thickness measured from the first end 815 to the second end 816. The seal 810 can define a bore 818. In some aspects, as shown, the seal 810 can be sized to seal against the flange 734 and thereby prevent leakage of fluid from or through a joint between the tail piece 230 and the meter 80 (shown in FIG. 2) or another mating portion of the piping 140 (shown in FIG. 2). In some aspects, the seal 810 can define an annular shape. In some aspects, the seal 810 can define a washer shape and can define a constant thickness.

In some aspects, the meter tail 200*b* can comprise a second gasket or seal 820. The seal 820, which can be a radial seal, can define a diameter. The seal 820 can define a bore 828. The seal 820 can be received within a space between the outer surface 232 of the tail piece 230 and the inner surface 211 of the adapter 210. In some aspects, as shown, the seal 820 can be sized to seal against the outer surface 232 of the tail piece 230 and thereby prevent passage of contaminants, e.g., sand and/or small rocks, from or through a joint 801 between the tail piece 230 and the adapter 210. More specifically, the seal 820 can be a dust seal. In some aspects, the seal 820 can define an annular shape and, more specially, can be an O-ring.

Again, the adapter 210 can be configured to be received within the opening 218, which can again be defined in the meter box wall 110. The adapter 210 can be secured to and in some aspects can be configured to swivel with respect to the meter box wall 110. In some aspects, the first end 235 can engage with the adapter 210. In some aspects, a portion of the tail piece 230 between the first end 235 and the second end 236 can engage with the adapter 210. The second end 236 can engage with the nut 220. More specifically, the first end 235 of the tail piece 230 can be received at least partially within the adapter; and the second end 236 can be received at least partially within the nut 220. One of the connection portions 737*a,b* such as, for example and without limitation, the first connection portion 737*a* can be the received within and threadably engaged with the adapter 210 and, more specifically, the connection portion 717 thereof. An axial position of the tail piece 230 can be slideably adjustable with respect to the adapter 210.

Again, as the adapter 210 rotates (e.g., about the axis 141) it can be allowed to turn freely without the tail piece 230, which can be constrained by the piping 140 or service piping, or another portion of the meter tail 200*b* itself rotating. The meter tail 200*b* or the tail piece 230 thereof can instead move inward or outward, toward or away from the meter 80. Again, the distance 170 (shown in FIG. 2) between the meter box wall 110 and the second end 236 of the tail piece 230—or another portion of the meter tail 200*b*—can thereby be adjustable.

Again, the tail piece 230 can be secured to the nut 220 with the fastener 260, and the nut 220 can be configured to rotate with respect to the tail piece 230 in an assembled condition. The meter tail 200*b* and, more generally, the meter tail 200 can incorporate but need not incorporate a valve. The meter tail 200*b* need no dynamic seal across the telescoping outer surface 232 of the tail piece 230, which seal can leak or drag across the outer surface 232 and thereby become dirty or scratched over time and/or increase the likelihood of a future leak, especially after use.

Figure 9:
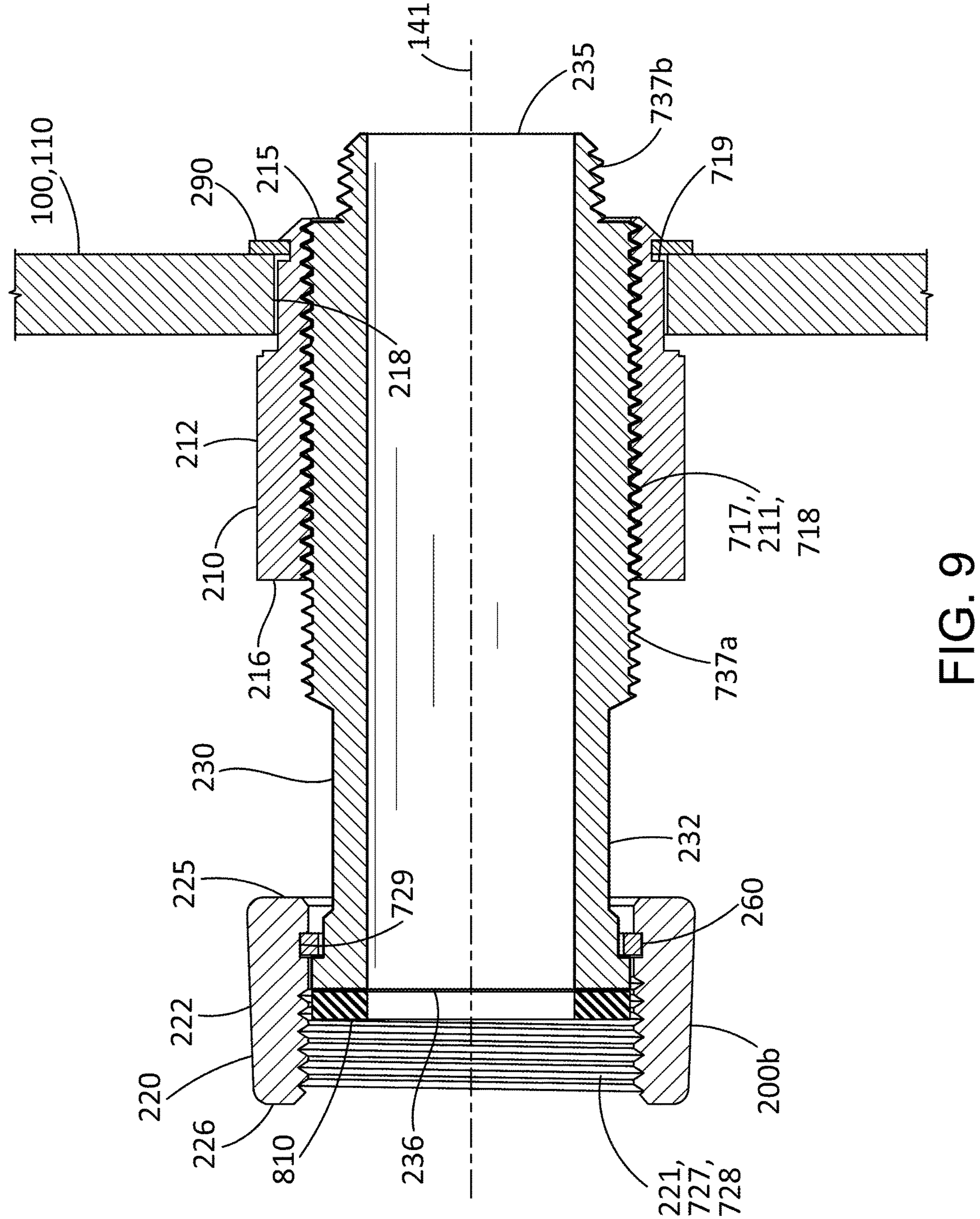
FIG. 9 is a sectional view of the meter tail of FIG. 4 taken along line 8-8 of FIG. 3A in accordance with another aspect of the current disclosure.

FIG. 9 is a sectional view of the meter tail 200*b* of FIG. 4 taken along line 8-8 of FIG. 3A in accordance with another aspect of the current disclosure. In some aspects, as shown, the connection portion 717 of the adapter 210 can extend an entire length thereof from the first end 215 to the second end 216. A range of the distance 170 (shown in FIG. 2) can thereby be increased because the connection portion 737*a* can travel further with respect to the connection portion 717 of the adapter 210. In some aspects, the first connection portion 737*a* can extend to the second connection portion 737*b*. In some aspects, the first connection portion 737*a* can extend further towards the second end 236. In some aspects, as shown, the meter tail 200*b* need not comprise the seal 820 (shown in FIG. 8).

A method of assembling the meter tail 200 and, more specifically, the meter tail 200*b* shown can comprise securing the adapter 210 of the meter tail 200*b* to the opening 218 defined within the meter box 100. The method can comprise securing the adapter 210 to the meter box wall 110 with the fastener 290. The method can comprise engaging the first end 235 with the adapter 210. The method can comprise securing the nut 220 to the tail piece 230 with the fastener 260. The method can comprise engaging the second end 236 with the nut 220. The method can comprise slideably adjusting an axial position of the tail piece 230 of the meter tail 200*b* with respect to the adapter 210. More specifically, the method can comprise adjusting the distance 170 between the meter box 100 and the second end 236 of the tail piece 230. In some aspects, the method can comprise adjusting the distance 170 by at least 0.001 inches or by at least 0.001 inches in either direction from a target position, i.e., 0.002 inches total. In some aspects, the method can comprise adjusting the distance 170 by at least 0.125 inches or by at least 0.125 inches in either direction from a target position, i.e., 0.25 inches total. In some aspects, the method can comprise adjusting the distance 170 by at least 0.25 inches or by at least 0.25 inches in either direction from a target position, i.e., 0.5 inches total. In some aspects, the method can comprise adjusting the distance 170 by at least 0.35 inches or by at least 0.35 inches in either direction from a target position, i.e., 0.7 inches total. In some aspects, the method can comprise adjusting the distance 170 by at least 0.5 inches or by at least 0.5 inches in either direction from a target position, i.e., 1.0 inches total. In some aspects, the method can comprise adjusting the distance 170 by at least 0.7 inches or by at least 0.7 inches in either direction from a target position, i.e., 1.4 inches total. In some aspects, the method can comprise adjusting the distance 170 by at least 1.0 inches or by at least 1.0 inches in either direction from a target position, i.e., 2.0 inches total. In some aspects, the method can comprise adjusting the distance 170 by at least 1.5 inches or by at least 1.5 inches in either direction from a target position, i.e., 3.0 inches total. The method can comprise sealing the joint 801 (i.e., the joint between the tail piece 230 and the adapter 210) with a seal. The method can comprise swiveling or rotating the adapter 210 about the axis 141 with respect to the meter box wall 110 without rotating the tail piece 230 or other portions of the meter tail 200*b*.

A method of use of the installed meter box 100 can comprise a thrust force acting on the meter box wall 110. The method can comprise stretching the piping 140 to some extent during movement of the meter box wall 110 and/or pulling the whole box toward the piping 140. When the meter tail 200*b* is pulled toward the meter 80, the method can comprise stretching a portion of the piping 140 such as, for example and without limitation, a portion of the piping 140 positioned outside of the meter box 100. The stretching can comprise applying a compression load on the inside of the meter box wall 110 against the adapter 210 or a portion thereof. When the meter tail is pushed away from the meter, the method can comprise compressing or snaking the pipe outside of the box. More specifically, the method can comprise exerting a compression load on the outside of the meter box wall 110, e.g., at the fastener 290.

In some aspects, various components of the meter tail 200 and, more specifically, the meter tail 200*b*, can be formed from or comprise a metal such as, for example and without limitation, solid brass. More specifically, the various components of the meter tail 200 can comprise a low lead brass alloy. In some aspects, the material tail 200 can have C-800 or NSF61 certification or can be compliant with the corresponding standards.

In some aspects, various components of the meter tail 200 such as, for example and without limitation, the seal 810, can be formed from a resilient, flexible, and/or compressible material. Such a component can be formed from a material such as a natural or synthetic rubber such as, for example and without limitation, ethylene propylene diene monomer (EPDM) rubber or nitrile rubber, which is also known as Buna-N. In some aspects, the various components can be formed from any other material, any of which can optionally be corrosion-resistant or replaceable for serviceability. For example, the bracket 310 can be formed from a corrosion-resistant material such as, for example and without limitation, stainless steel. The various components of the meter tail 200 can be formed from any one or more of a variety of manufacturing processes. For example and without limitation, various components of the meter tail 200 can be fabricated using subtractive manufacturing processes such as machining, forging, stamping; additive manufacturing processes such as three dimensional printing; and any other forming and assembly processes such as bending and riveting.

One should note that conditional language, such as, among others, "can," "could," "might," or "may," unless expressly stated otherwise, or otherwise understood within the context as used, is generally intended to convey that certain aspects include, while other aspects do not include, certain features, elements, and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Many variations and modifications may be made to the above-described aspect(s) without departing substantially from the spirit and principles of the present disclosure. Further, the scope of the present disclosure is intended to cover any combinations and sub-combinations of all elements, features, and aspects discussed above. All such modifications and variations are intended to be included within the scope of the present disclosure, and all possible claims to individual aspects or combinations of elements or steps are intended to be supported by the present disclosure.

That which is claimed is:

1. A meter tail comprising:

an adapter configured to be received within and secured to an opening defined within a meter box; and a tail piece defining a first end and a second end and extending from the adapter, the first end engaged with the adapter and the second end configured to be engaged with a meter, the tail piece extending unbroken from the first end to the second end, an axial position of the tail piece being slideably adjustable with respect to the adapter, a distance between the meter box and the second end of the tail piece thereby being adjustable.

2. The meter tail of claim 1, wherein:

the first end is received at least partially within the adapter, the adapter further defining a threaded portion on an inner surface; and the first end is threadably engaged with the adapter.

3. The meter tail of claim 1, wherein the tail piece is monolithic.

4. The meter tail of claim 1, wherein a portion of the tail piece positioned between the first end and the second end and offset from each of the first end and the second end defines a threaded portion, the threaded portion being configured to slideably engage with a threaded portion of the adapter.

5. The meter tail of claim 4, wherein the threaded portion is a first threaded portion and the first end of the tail piece defines a second threaded portion, a maximum diameter of the first threaded portion being greater than a maximum diameter of the second threaded portion.

6. The meter tail of claim 1, further comprising a seal received within a space between an outer surface of the tail piece and an inner surface of the adapter, a joint between the tail piece and the adapter sealed with the seal.

7. The meter tail of claim 1, further comprising a fastener configured to secure the adapter to the meter box.

8. The meter tail of claim 1, wherein the adapter defines a first end and a second end, the adapter further defining a threaded portion on an inner surface, the threaded portion extending from the first end of the adapter to the second end of the adapter.

9. The meter tail of claim 1, further comprising a nut configured to be received about the tail piece and connected to the meter, the second end of the tail piece configured to be engaged with the meter through the nut.

10. The meter tail of claim 1, wherein the tail piece extends completely through the adapter.

11. The meter tail of claim 1, further comprising a fastener securing the nut to the tail piece in an axial direction with respect to an axis of the meter tail, the nut being able to rotate with respect to the tail piece in an assembled condition.

12. A meter box system comprising:

a meter box; and a meter tail comprising:

an adapter received within and secured to an opening defined in a meter box wall of the meter box; and a tail piece defining a first end and a second end and extending from the adapter, the first end engaged with the adapter and the second end configured to be engaged with a meter, a tail piece of the meter tail being slideably adjustable with respect to the adapter.

13. The system of claim 12, wherein a meter box wall of the meter box comprises one of a polymer material, cast iron, and concrete.

14. A method of assembling a meter tail, the method comprising:

securing an adapter of the meter tail to an opening defined within a meter box; and slideably adjusting an axial position of a tail piece of the meter tail with respect to the adapter.

15. The system of claim 12, wherein the opening is a first opening, and wherein piping comprising the meter tail extends through the first opening and through a second opening defined in the meter box opposite from the first opening.

16. The method of claim 14, wherein the meter tail further comprises a nut, the tail piece extending from the adapter to the nut, the second end engaged with the nut, the tail piece extending unbroken from the first end to the second end.

17. The method of claim 16, wherein the tail piece is monolithic.

18. The method of claim 14, wherein slideably adjusting an axial position of a tail piece of the meter tail with respect to the adapter comprises adjusting a distance between the meter box and a second end of the tail piece.

19. The method of claim 18, wherein adjusting a distance between the meter box and a second end of the tail piece comprises adjusting the distance by at least 0.3 inches.

20. The method of claim 14, wherein the meter tail further comprises a seal, the method further comprising sealing a joint between the tail piece and the adapter with the seal.

* * * * *